United States Patent [19]

Wallen, Jr.

[11] Patent Number: 5,157,712
[45] Date of Patent: Oct. 20, 1992

[54] TELEPHONE NUISANCE CALL MITIGATION SCREENING DEVICE

[76] Inventor: James Wallen, Jr., 5925 Oak Grove St., Lorton, Va. 22079

[21] Appl. No.: 492,761

[22] Filed: Mar. 13, 1990

[51] Int. Cl.⁵ .................. H04M 1/65; H04M 1/66
[52] U.S. Cl. .................. 379/74; 379/67; 379/77; 379/199
[58] Field of Search .............. 379/77, 74, 199, 67, 379/68, 75, 76, 70

[56] References Cited

U.S. PATENT DOCUMENTS

| | | | |
|---|---|---|---|
| 3,514,548 | 4/1967 | De Meo | |
| 3,654,396 | 4/1972 | Biezeveld | |
| 3,748,721 | 7/1973 | Alexander | |
| 3,902,016 | 8/1975 | Blouch | |
| 3,936,617 | 2/1976 | Bolgiano | |
| 4,006,316 | 2/1977 | Bolgiano | 379/199 X |
| 4,160,125 | 7/1979 | Bower et al. | 379/77 X |
| 4,266,098 | 5/1981 | Novak | |
| 4,345,113 | 8/1982 | Shelley | |
| 4,387,272 | 7/1983 | Castro et al. | |
| 4,393,278 | 7/1983 | Miyoshi | |
| 4,420,656 | 12/1983 | Freeman | |
| 4,546,213 | 10/1985 | Dick | 379/95 |
| 4,584,434 | 4/1986 | Hashimoto | |
| 4,596,900 | 6/1986 | Jackson | 379/77 X |
| 4,639,552 | 1/1987 | Hall | 379/199 |
| 4,802,202 | 1/1989 | Takahashi et al. | 379/67 |
| 4,827,501 | 5/1989 | Hansen | 379/199 |
| 4,845,743 | 7/1989 | Lutz | 379/199 |
| 4,926,470 | 5/1990 | Sanford | 379/199 |
| 4,937,854 | 6/1990 | Sarakas | 379/199 |

OTHER PUBLICATIONS

"Archer Technical Data", Custom Packaged in U.S.A. by Radio Shack, Catalog No. 276-1303, Panels 1-12 (Dec. 1989).
"Your Own Phone with Your Own Personal Number", Industrial and Commercial Computer Products, Inc. (Dec. 1989).

Primary Examiner—Stuart S. Levy
Assistant Examiner—Joseph A. Rhoa
Attorney, Agent, or Firm—Cushman, Darby & Cushman

[57] ABSTRACT

A telephone nuisance call mitigation device operates in conjunction with an answering machine. The usual ringer of the user's telephone(s) is deactivated. The answering maching produces a message which instructs the user to enter his secret code if he has it or else just to leave a message after the tone. The mitigation device monitors for the proper secret code being entered, and if received produces an off hook and a ringing tone in the user's home for a predetermined period. Otherwise, the user can only leave a message, and a ringing tone will never be provided to the user's house. Provision is also made for preventing erroneous detections during call out operations, and for resetting the system to maintain synchronization. The mitigation device is continuously parallel to the telephone line.

29 Claims, 3 Drawing Sheets

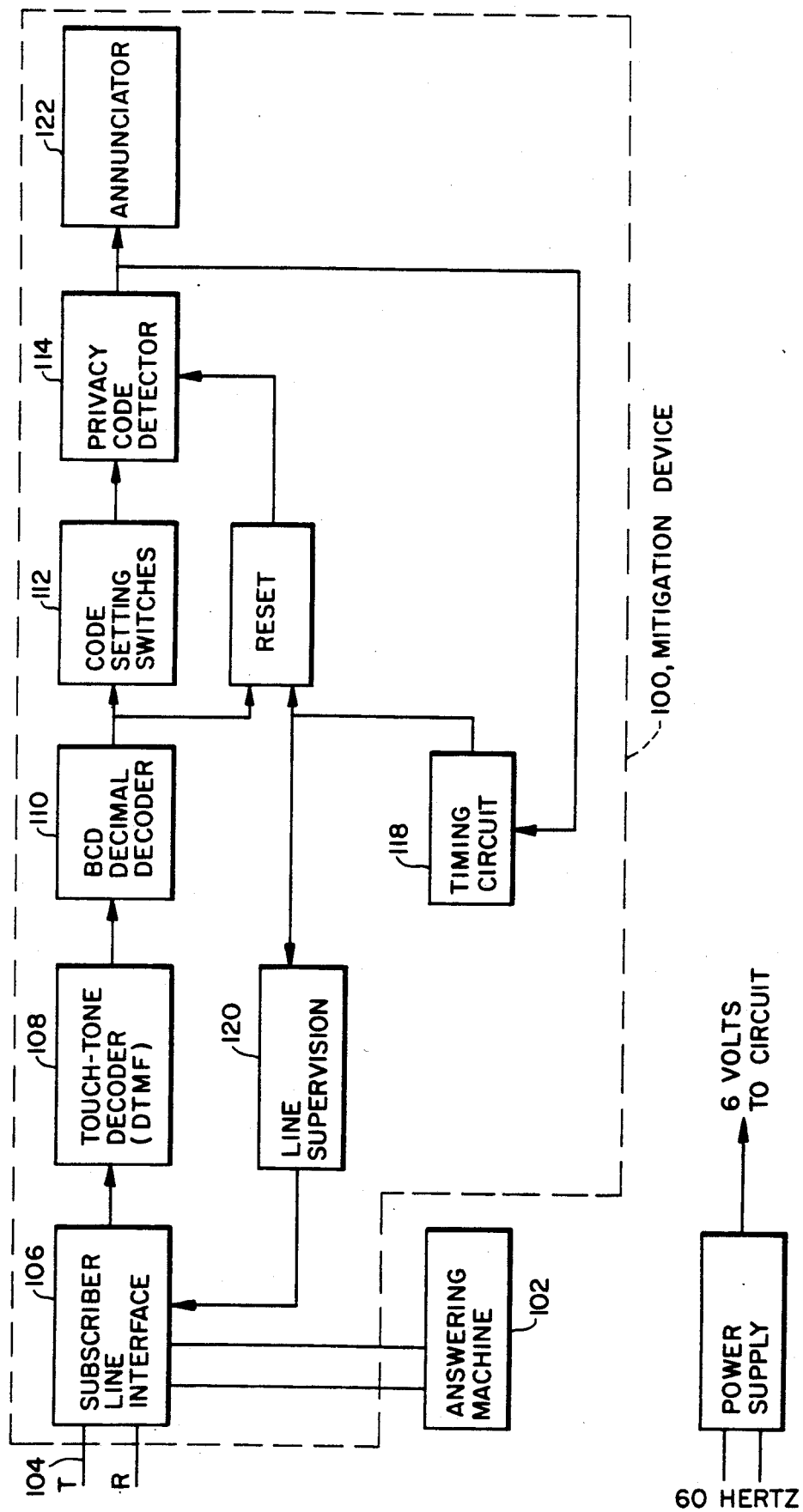

TELEPHONE NUISANCE CALL MITIGATION SCREENING DEVICE

FIELD OF THE INVENTION

The present invention relates to a device intended for preserving a user's privacy by allowing the user to choose which telephone calls the user will accept. The calls which are not accepted are recorded by a telephone recording device.

BACKGROUND AND SUMMARY OF THE INVENTION

Telephones have proven to be very adept at invading the privacy of the person being called (herein the "user" or the "called party"). A particularly annoying technique is that of salesmen calling during the dinner hour to sell some dubiously useful device. In addition, wrong numbers have become more prevalent as more and more people need telephones, and the telephone company is forced to reassign more quickly those numbers which have been previously used.

It is an object of the present invention to circumvent nuisance telephone calls. For purposes of the invention, desired calls are those that the called party wants to receive, and nuisance calls are those that the called party does not want to receive. These nuisance telephone calls can be both of an incidental nature and of an intentional nature. Incidental nuisance calls are those resulting from dialing the wrong number, either through mistake or by using an outdated number. Intentional nuisance calls are those which result from telephone solicitation, private telephone calls from business acquaintances, telephone calls from people whom the called party does not want to talk with, or so-called obscene telephone calls which have the object of intimidating or harassing the called party.

There have been several attempts to mitigate nuisance telephone calls. The technique most prevalently used is to obtain an unlisted telephone number. This has a certain mitigating effect as it makes it a little harder for someone to find a particular telephone number. However, this method has certain disadvantages and only limited usefulness.

Unlisted numbers have associated fees charged by the telephone companies. The telephone company charges both a one-time fee and a monthly fee for allowing the user the privilege of having his phone number unlisted. Another disadvantage is that the intended use of a telephone is somewhat defeated by having an unlisted telephone number. If the number is unlisted, many desired calls may be missed, because someone you may want to talk to may never be able to get your number.

Moreover, the telephone number, even if unlisted, will still eventually get to salesman-type callers. Through normal usage, the telephone number will eventually get out to many parties. Certain items such as credit applications and the like will always be sources for telephone numbers. By giving this access to one's telephone number, it will eventually get sold to telephone solicitation agencies, thus ruining whatever privacy one once had. The only real solution has been to change the number, and making sure all your friends, relatives, etc., get the new one. Those that do not will be unable to call.

Another method which has been more recently used for mitigating unwanted telephone calls is to use the telephone answering device as a call screening device. The disadvantage of this method is that the subscriber must be disturbed by the ringing for each incoming call. The subscriber must go near the answering machine, to determine if the person calling is someone who the subscriber needs or wants to talk to. If the call is of an urgent nature, or from a desired calling party, it may be missed if this technique is used. Moreover, some people have a phobia of answering machines, and refuse to leave messages and just hang up.

A third technique is a call tracing method. Some telephone companies offer a service which allows each call to be automatically traced and have the number of the caller displayed to the subscriber. If the call turns out to be a malicious call, the telephone number of the calling party is known. However, for purposes of screening calls, this method is of limited usefulness. The subscriber may recognize certain telephone numbers and know that he wants to answer when these telephone numbers are calling. However, this technique requires the subscriber to have a large memory to recognize every telephone number which is calling. In addition, there is a substantial monthly charge for this service. Finally, this method has the same disadvantage as the telephone answering machine method—it requires the user's peace and quiet to be disturbed each time a telephone call comes.

The present invention addresses this need in the art by providing a device which obviates all of these problems. The present invention defines a device which is intended in its preferred embodiment to operate in conjunction with an answering machine. In operation, the user turns off all ringers on the phones in his house. The device routes calls between one of two actions. Either the call will operate the answering machine and the user will enter a message on the answering machine, or else, if the caller has the predetermined and secret code, the call will be routed to some external and auxiliary ringers located in the user's home.

If the caller does not have the predetermined code, the ringers in the user's home are not activated, and the caller's only option is to leave a message. This enables the caller to leave a message for the user, obviating the problem of unlisted telephone numbers. If the code becomes too well known, it can be changed, and the worst that happens is that a desired caller leaves a message the first time that they call after the code is changed. However, if the caller has the predetermined code, the caller can cause the ringer in the user's home to be operated.

The preferred embodiment of the device operates in conjunction with a standard telephone answering machine. The answering machine answers the telephone in the usual way, and the message on the answering machine is an instructional message to the user on how to operate the device. If the user has the predetermined code, it must be entered before the time-out period of the answering machine is over. If the code is entered, the telephone line is seized for a predetermined period of time by the present invention which also initiates a ringing tone within the user's home for this predetermined period.

According to other preferred aspects of the invention, various techniques are also used to insure proper operation of the device. Since the device is operated using touch-tone characters, it would be possible to initiate the device inadvertently during calling out by a random sequence inadvertently matching the predetermined code. In order to guard against this possibility, the present invention uses an exclusion character as part of the code. The exclusion code is a code intended never to occur in a called-out number. Similarly, the code of the present invention must be received in proper synchronization in order to avoid a user trying all possibilities to get through eventually. In order to do this, the invention also uses an initialization character as one element of the code, and this initialization character is one which is not used in any secret code.

Various methods have been attempted in the art to meet the objective of the present invention, but all of them have had serious drawbacks which have prevented user acceptance of these devices.

U.S. Pat. No. 4,387,272 to Castro has a similar objective to the present invention. Castro desires to decide whether or not the calling party is a desired one, and to send all nuisance calls to the answering machine. In order to do this, Castro receives each telephone call, and then waits for a pre-established code after having sent a ringback signal. If the code is not received after a predetermined time, the telephone line is connected to an answering machine. The answering machine only answers after it is decided that the code will not be coming. If the code is received, it is displayed and an acoustic signal source is activated.

Castro, however, has many drawbacks. First of all, the system is extremely complicated because of its basic inherent design. Castro requires much interface with the telephone answering machine. If it is decided that the call should be routed to the answering machine, Castro must somehow turn on the answering machine to record the call. This means that Castro would either have to use a specially designed answering machine, or produce tones or the like to turn on the answering machine somehow. Castro describes in column 8 beginning at line 25 how it must send the answering machine a signal similar to those of a telephone call so that the machine can "answer".

Another drawback of Castro is that the user gets no instruction on what to do upon the call connect. Castro sends a ringback tone, but if the user does not know what to do he may not enter the predetermined code even if he has it. This might especially happen in an emergency situation where the user is nervous, just the kind of situation in which the user would want to receive the telephone call. Also, the user has no way of knowing to wait for the answering machine to leave a message.

Another attempt was made in U.S. Pat. No. 3,514,548 to Demeo. This device permitted normal usage of a telephone, however, it did not allow incoming calls to be annunciated unless the caller dialed an appropriate supplemental code number. The problems with this device are even worse than those of Castro. If the caller does not have the code number, the caller is completely locked-out, and cannot get through to the called party at all. In addition, it is likely that Demeo would occasionally erroneously set off the annunciator during the making of outgoing calls.

U.S. Pat. No. 4,802,202 to Takahashi operates in conjunction with an answering machine, the answering machine being configured to ask for the user's telephone number. When the user enters his telephone number, Takahashi compares it against one of a plurality of prestored numbers to decide whether the call will be accepted. This obviously has a number of drawbacks including requiring a large amount of memory and also requiring the user to store many telephone numbers. A mistake in storing the telephone number will cause a called party to be avoided.

U.S. Pat. No. 4,584,434 also provides an outgoing message indicating that a predetermined code should be entered. However, this number is only used to route the operation through different lines in the installed location.

Other less applicable attempted solutions are found in U.S. Pat. Nos. 4,546,213; 4,266,098; 3,654,396; 4,345,113; 4,393,278; 4,639,552; 4,420,656; 3,902,016; 3,936,617; 4,006,316; and 4,827,501.

BRIEF DESCRIPTION OF THE DRAWINGS

These and other aspects of the invention will now be described in detail with reference to the accompanying drawings, wherein FIG. 1 shows a block diagram of the invention.

DESCRIPTION OF THE PREFERRED EMBODIMENT

Figure 2A:
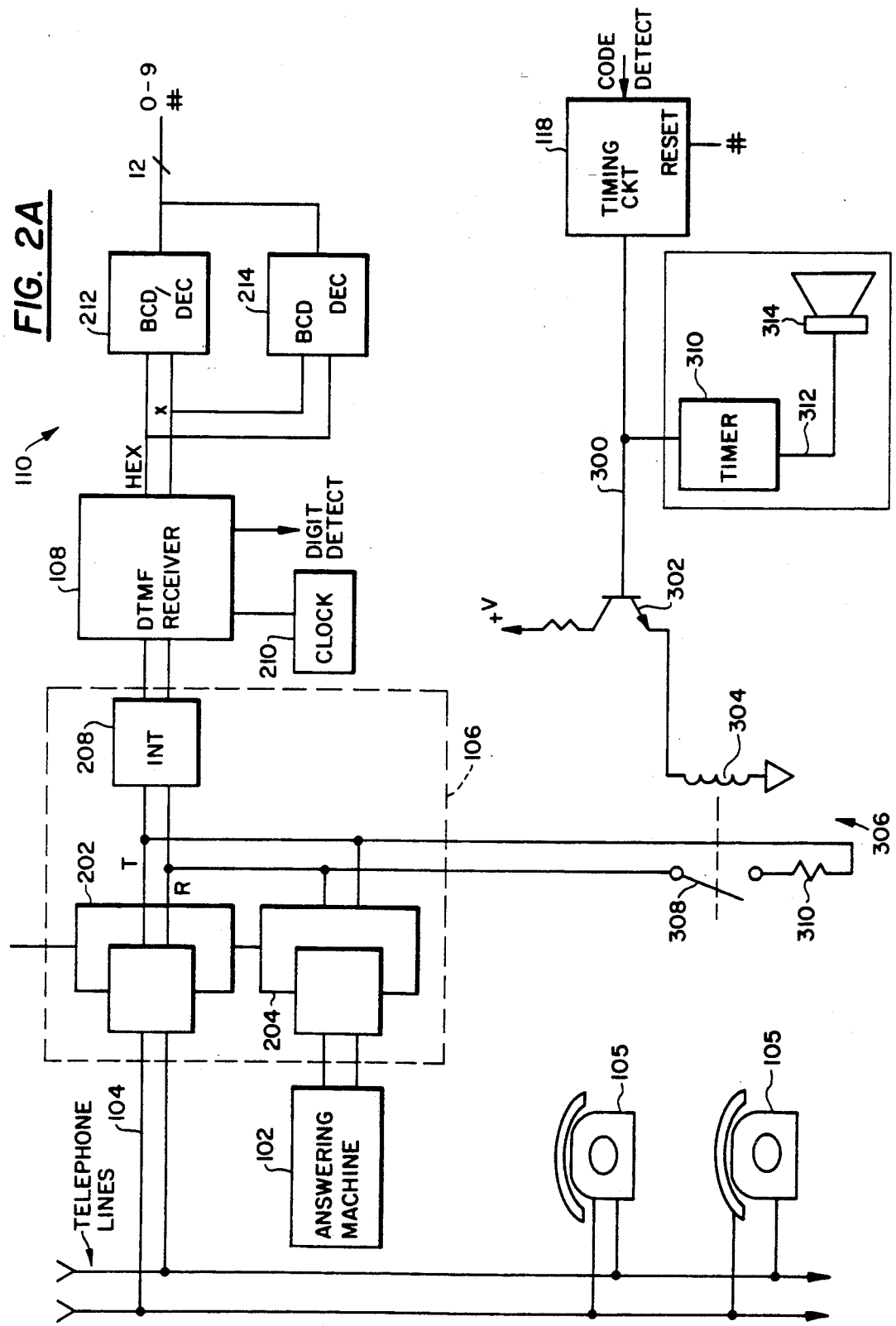
FIGS. 2A and 2B show a detailed schematic diagram of the invention.

A presently preferred embodiment of the invention will now be described in detail with reference to the drawings. The preferred embodiment of the invention is shown in block diagram form in FIG. 1, and in schematic form in FIGS. 2A and 2B. The preferred embodiment uses mitigation device 100, connected to a standard answering machine 102, which is of any usual type. An alternate embodiment uses the answering machine and mitigation device as a single unit.

The incoming telephone lines 104, include the tip line (T) and the ring line (R) in the usual way. These incoming lines are first connected to subscriber line interface 106.

Subscriber line interface 106 includes an input modular jack 202 and an output modular jack 204 connected in parallel. This enables the answering machine 102 to be connected in parallel across the subscriber line, along with mitigation device 100. The tip and ring lines ar then interfaced by interface unit 208 which typically includes an isolation transformer as well as a pair of reverse connected zener diodes. These components are provided to prevent abnormally high voltage signals from reaching sensitive parts of the mitigation device, and also prevent any voltages from a malfunction in the device from reaching the telephone line 104.

Telephone line 104 is then connected to a touch tone decoder 108 which is embodied as a dual tone multi frequency or DTMF receiver. The DTMF receiver used in the preferred embodiment is Part No. SSI202 also available at Radio Shack as Part 276-1303. DTMF receiver rejects normal voice data on the telephone line 104, and accepts only dual tone, multi-frequency codes such as used in dialing on a telephone line. The DTMF receiver must also have an external crystal for controlling the frequency of the DTMF clock, which in this embodiment is crystal 210. The preferred embodiment of the invention uses a 3.58 megahertz crystal, due to its ready availability for use in a television color burst.

The output of the touch tone decoder 108 is sent to BCD-to-decimal decoder 110. This device is formed of a pair of BCD encoders 212 and 214 of the 74LS42 type which convert the output from DTMF receiver 108 into a 1 of 16 decimal output. This decimal output includes the digits 0-9 as well as the "#" sign and the "*" sign which are used on the commercially available telephone devices, and the "A", "B", "C", and "D" characters on certain telephones.

According to an alternate embodiment of the invention, only one BCD-to-decimal encoder is used and therefore only, for instance, 0-8, # and * are available for us in the codes. This will enable only these certain characters to be used for the predetermined code.

Figure 2B:
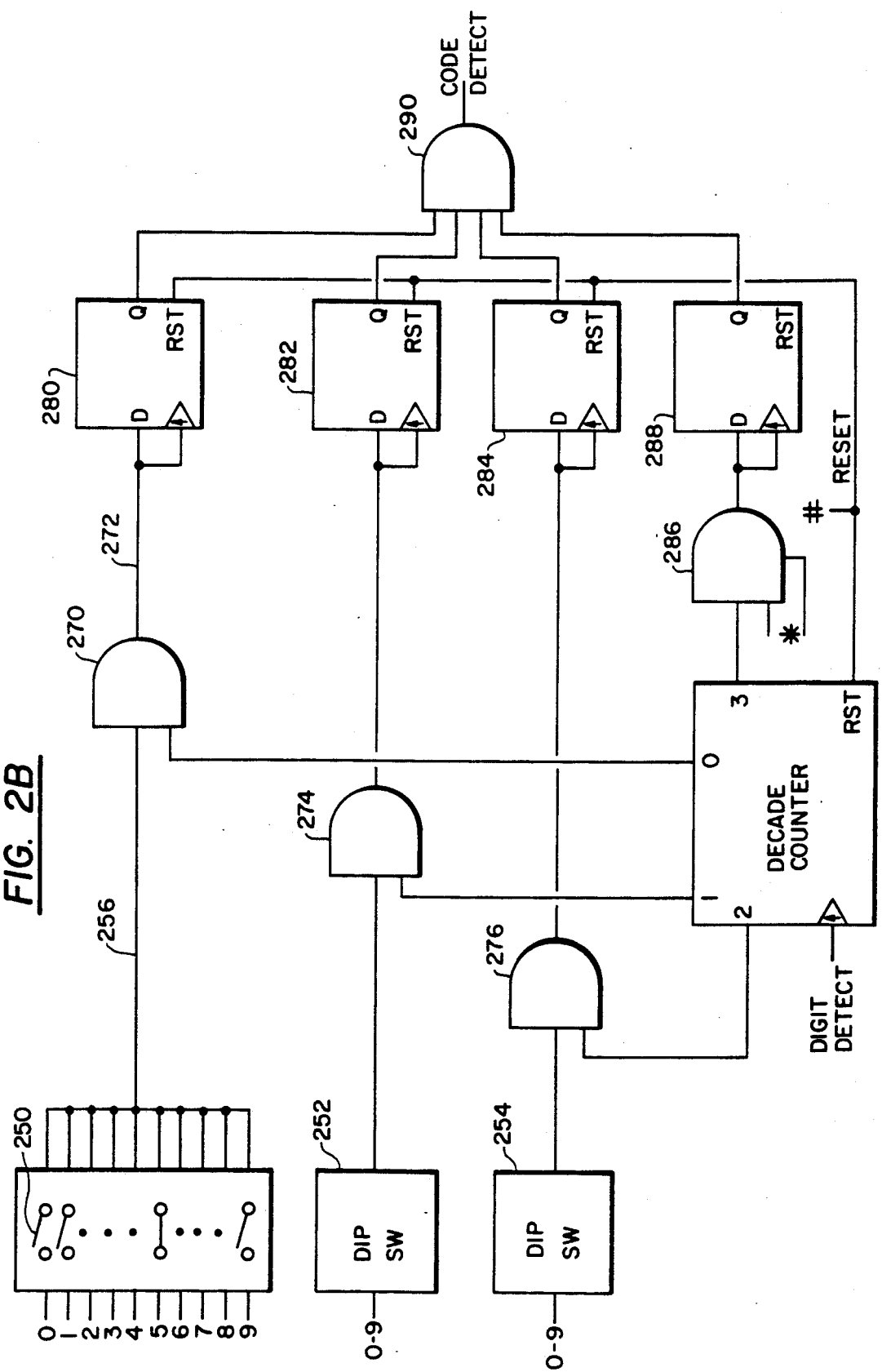

The outputs of the BCD-to-decimal decoder 110 are coupled to code setting switches assembly 112, which is shown in detail in FIG. 2B. The code setting switch assembly 112 includes three banks of dip switches 250, 252 and 254 in this embodiment. Each dip switch must include 10 switches to be able to select any of the numerals 0-9 or less if less numbers are desireable. The device is shown with detailed connections to dip switch 250, where each numeral-indicative output from BCD/Decimal decoder 110 is connected to an individual one of the switches. The outputs of all switches are connected in parallel together, producing an output of a "1" value only when the digit of the input code (0-9) matches a switch which is closed (e.g., switch 5 in bank 250 in FIG. 2B).

Since switch 5 in bank 250 is shown closed, whenever the DTMF receiver 108 detects a "5", a "1" will be produced on line 256 as an output of the switch bank 250. At all other times, the output on line 256 will be a "0".

Dip switches 252 and 254 are configured the same as 250, but are shown in less detail.

Each output of each dip switch, therefore, achieves an active state whenever the code for which it is set is entered. This means that a "1" will appear on line 256 any time the numeral 5 is dialed, either during the predetermined code, during an outgoing call or at any other time.

While dip switches are shown as being used in FIG. 2B, the code setting switches could alternately be embodied by a plurality of jumpers. While three sets of switches are shown as being used, less security could be provided by using one set of switches for all three codes, or by using more switches for more codes even more security could be provided. Three digits provide a reasonably low probability for a residential environment, and dip switches enable the code to be changed at random in case it should become known.

More than one switch can be closed on the switch assembly, and this will have the effect of making the code which will be accepted an "OR" of the multiple closed switches.

The outputs of the dip switches are sent to privacy code detector 114. It should be understood that inverter circuitry may be necessary in privacy code detector 114, although this has not been shown for simplicity of explanation.

Whenever a character that has been selected by any of code setting switches 252, 254 or 256 is dialed or entered, it may produce outputs which may leave the logic of the device in an indeterminant state. Accordingly, it is desireable to reset the logic 114 at the beginning of each code entry. The preferred embodiment of the present invention resets the logic using an initialization character. This character can be any character, but cannot be used anywhere within the personal code (or else it will reset it). In the preferred embodiment, the "#" sign is used as the initialization character.

It is possible that eventually a dialing-out condition would randomly enter the secret code. Therefore, the present invention also uses an exclusion character to guard against an accidental calling out initiation. This character is used as an ending of the code in the preferred embodiment, and this code will only operate properly if the exclusion character is never (or very rarely) a part of an outgoing telephone call. The preferred embodiment of the invention uses the "*" sign as the exclusion character, and this character is used as the final digit of the code.

The privacy code detector operates as follows.

Each time DTMF receiver 108 receives a character, it produces a digit detect output as shown in FIG. 2A. This digit detect output is connected to a clock input of decade counter 260. The decade counter cycles through a count beginning each time it is reset and advancing in count each time it is clocked. The "0" output of decade counter 260 is connected to a first input of AND gate 270, and is therefore ANDed with the output 256 of code setting switches 250. This means that the output of AND gate 270 will be high only if the digit 5 is dialed in the first cycle after a reset (or after the decade counter 260 cycles through its entire operation and is back to count 0). Similarly, AND gate 274 receives output "1" from decade counter 260, and AND gate 276 receives output "2" from decade counter 260. The respective outputs of these AND gates therefore indicate that (1) the digit selected on the code setting switch has been entered, and (2) it is the proper clock cycle for the entry.

The outputs of the AND gates are each coupled to a D type flip flop, although any set-reset type latch could also be used. Output 272 is shown connected to latch 280, at both its D and clock inputs.

The effect of this is that D latch 280 will be set only when (1) a "5" digit is input and (2) the decade counter is on count "0".

Similar D flip flops 282 and 284 are provided for the second and third digits connected to AND gates 274 and 276.

In order to operate the exclusion circuitry, the * sign is used as the final element of the code. Accordingly, the asterisk sign (from BCD decoder 212/214 in FIG. 2A) is ANDed with count 3 (fourth real digit of the code) from the decade counter by AND gate 286, and input to D flip flop 288.

The outputs of all D flip flops 280, 282, 284 and 288 are all input into 4-input AND gate 290. When these outputs are all high, the output of AND gate 290 goes high, producing a code detect signal.

In order to prevent an erroneous detection of a code detect signal, and to allow the code detect to be properly detected, provision is made for resetting D type flip flops 280, 282, 284 and 288. The "#" sign key resets the decade counter 260, as well as D type flip flops 280, 282, 284 and 288. This enables synchronization because the first digit after the "#" will always be decade counter "0".

In an alternate variant of the invention, the "#" sign is ORed with a higher output (e.g. output "6") of the decade counter to form the reset signal. This means that when the decade counter gets to, for example, count 6, it will reset and also reset all of the D type flip flops. This prevents the following scenario from taking place.

It is inevitable during normal operation that sooner or later, dialing the digit 5 will coincide with the 0 count of the decade counter just by random occurrences. When this happens, flip flop 280 will be set. If the user never presses the "#" button, which presumably should not happen until the secret code is being entered, flip flop 280 will stay set.

In similar fashion, flip flops 282 and 284 may become set through random processes (flip flop 280 will stay set). This will not set off the operation of the system because of the missing exclusion character, but will leave the system essentially "armed". This could cause two problems to occur.

First during call out, the user might erroneously press the "*" key, and this would immediately cause an enunciation to occur. This could be easily reset by hitting the initialization character ("#" sign). More serious, however, is that an armed device would mean that any nuisance caller could enter any code at all, followed by the "*" and access the user's telephone. Therefore, one way of defeating such a device might be to enter "#XXX*" (where X is don't care) and this would sometimes work.

This is a somewhat unlikely situation, but can be easily prevented by tying output 4 or 5 of the decade counter as an OR with the "#" sign detect to form a reset signal each time the decade counter counts up that high. This will provide a situation where it is highly unlikely that any of the D type flip flops will ever be set, and the odds of all of them being set are astronomically low. An alternative is to use one of 0–9 as the initialization character and never as part of the code. Normal calling out will then randomly reset the latches.

The code detect output is shown in FIG. 2A, and immediately input to timing circuit 118 which in this embodiment is embodied by a 555 type timer. The preferred time of operation for this timer is 30 seconds, although other times are possible. For 30 seconds after the code detect signal is obtained, timer 118 produces a high level signal on line 300 which is coupled to a base of transistor 302.

The transistor has its collector connected to a source of voltage, and its emitter connected to coil 304 of relay 306. The relay contacts 308 of relay 306 are connected in series between the tip and ring lines. Resistor 310 is also connected in series with this relay contact.

Therefore, while timing circuit 118 is producing its active level, the relay contacts 308 are energized to close, to connect resistor 310 in series between the tip and ring signals. This produces an off-hook condition which is detected by the central office, which maintains the line open for this time.

During the time the line is open, the user is also notified that a caller has entered the proper code. For this purpose, a second timing circuit 310 is used. This second timing circuit is typically an on-off circuit with a period of one second, for example. Whenever the signal on line 300 is high, timing circuit 310 produces an output 312 which has a one second period. The output 312 is connected to annunciator 122, for instance a piezo buzzer 314, which announces to the user that the call has been accepted.

When the user picks up the phone, the off hook is continued by the user. Therefore, at the end of the time-out period of timing circuit 118, the system will not disconnect when relay contacts 308 reopen. However, annunciator 122 will continue to operate until the time out of timing circuit 118, unless the user resets the system by entering the initialization character.

Since the answering machine will answer and announce for all calls, any caller, even one with the predetermined code, can leave a message. Even if the secret code is entered, the machine will still be recording, and will record whatever the desired caller says. Therefore, if the user is not home, a message can still be left.

Although only a few embodiments have been described in detail above, those of ordinary skill in the art will certainly understand that many modifications are possible in the preferred embodiment without materially departing from the teachings thereof. For instance, although the system has been described as being embodied by hardware circuitry, everything except for the touch tone decoder and line supervision circuitry could be embodied by a microprocessor. Although the code setting switches have been described as being dip switches, they could alternately be any other type of switches including rotary switches or pluggable jumpers. The code in this embodiment is three digits long plus the exclusion and reset codes, but any other length is alternatively possible. Of course the time periods described herein are only exemplary and other time periods could be used. In addition, it should be understood that the system could also be used to provide a signal to the answering machine after code detect, if the user does not pick up the line. The way in which this signal would be provided would be similar to that discussed above in Castro, U.S. Pat. No. 4,387,272, and could easily actuate the answering machine to record a message even after the code detect has been recognized. Also, not all touch-tone digits are necessary to be used, and the code which could be chosen could be limited to less than the whole set of 0–9, # and *.

The device of this invention is intended to be used with the ringers in the users home off, and a separate annunciator installed. However, the usual ringer on the telephones could be used by producing the 50 V p-p signal to operate these ringers.

All such modifications are intended to be encompassed within the scope of the claims which follow.

What is claimed is:

1. A telecommunications nuisance call mitigation device adapted for use with an answering machine of the type which plays a message to a caller indicating that the caller should enter a code, said mitigation device comprising:
   means for recognizing whether a code entered after said message coincides with a preset code in said device;
   timing means, responsive to said recognizing means, for beginning a predetermined time period after recognizing said code as coinciding with said preset code;
   means, responsive to said timing means, for producing an off hook indication to a central office, during said predetermined time period, and for producing a signal indicative of a non-nuisance call during said time period; and
   means for connecting said recognizing means and said off hook indication producing means in parallel with a telephone line at all times after installation with the telephone line.

2. A device as in claim 1 wherein said signal indicative of said non-nuisance call is a ringing tone to a user, and said recognizing means includes means for recognizing a plurality of different touch-tone type characters and means for recognizing a predetermined sequence of predetermined ones of said touch tone characters as said preset code.

3. A device as in claim 2 wherein one of said touch tone characters represents an initialization character and wherein said timing means is responsive to said recognizing means and is reset upon said recognizing means recognizing said initialization character.

4. A device as in claim 3 wherein said predetermined sequence of touch tone characters includes one exclusion character which is not normally used during placing telephone calls.

5. A device as in claim 4 wherein said recognizing a predetermined sequence means includes at least one switchable device which is switchable to determine which of a plurality of said characters represents a set character, and includes counter means, responsive to a digit detect output of said recognizing means, for counting a number of digit detects which have been produced and producing a count output indicative thereof, and means for determining if a set character, set by said switching device, is produced at a predetermined count indicated by said counter means, and producing a code detect output when all proper digits are located during proper counts.

6. A device as in claim 5 wherein said counter means and said determining means are also reset upon recognition of said initialization character.

7. A device as in claim 2 wherein said predetermined sequence of touch tone characters includes one exclusion character which is not normally used during placing telephone calls.

8. A nuisance call mitigation device, adapted to operate with a plurality of telephone which have ringers that are, at least initially, disconnected, comprising:
- an answering machine, having a message recorded thereon indicating that a user should either enter the identification code or record a message after the tone;
- digit detecting means, coupled to a telephone line, for detecting digits input therefrom;
- logic means, coupled to said digit detecting means, for recognizing a predetermined sequence of predetermined ones of said digits to recognize a proper code only after said answering machine has played said message;
- line supervision and annunciating means, coupled to said logic means, for holding the telephone line open and annunciating an incoming call to the user, only for a predetermined time after said logic means determines that a proper code has been entered; and
- means for connecting said answering machine, said digit detecting means, said logic means and said line supervision and annunciating means in parallel with the telephone line at all times after installation with the telephone line.

9. A device as in claim 8 wherein said line supervision and annunciating means includes a relay and a resistor, said relay being closed to form a current path through said resistor across two wires constituting said telephone line to produce an off hook condition to hold said telephone line.

10. A device as in claim 9 wherein said digit detecting means is a DTMF receiver.

11. A device as in claim 10 wherein said logic means includes a plurality of switch arrays, each array being set with at least one of said codes, and means for determining if the proper code is produced during a cycle of operation to which it is associated.

12. A device as in claim 8 wherein said digit detecting means detects one of said characters as being an initialization character, and resets said logic means and said line supervision and annunciating means when said initialization character is detected.

13. A device as in claim 12 wherein said digit detecting means detects one of said digits as being an exclusion code, which is one not normally entered to access outgoing telephone numbers, and wherein said logic means includes means for detecting said exclusion code as a necessary part of said proper code.

14. A device as in claim 8 wherein said digit detecting means detects one of said digits as being an exclusion code as a necessary part of said identification code, which is one not normally entered to access outgoing telephone numbers, and wherein said logic means includes means for detecting said exclusion code as a necessary part of said proper codes.

15. A method of mitigating unwanted nuisance calls, comprising the steps of:
- an initial step of connecting a logic module and an answering machine in parallel with a telephone line, and thereafter maintaining said logic module and said answering machine in parallel with the telephone line at all times;
- recording a message on said answering machine indicating that if the incoming caller has an identification code to enter it, or else to leave a message;
- playing said message in response to an incoming call;
- after said playing step, receiving incoming signals from a telephone line;
- determining if the incoming signals coincide with a pre-stored sequence of signals forming a predetermined code;
- starting a timer if the incoming code coincides with the prestored predetermined code;
- producing an off hook signal to the central office while said timer is running; and
- operating a telephone call annunciation to the user while said timer is running, and wherein said receiving, determining, starting, producing and operating steps are carried out by said logic module.

16. A method as in claim 15 comprising the further step of resetting said timer upon detecting a predetermined digit.

17. A method as in claim 15 wherein said method is used with at least one telephone, and comprising the further step of, prior to said receiving incoming signals step, preventing said at least one telephone from ringing due to said incoming signals.

18. A nuisance call mitigation device adapted for use with an answering machine of the type which plays a message to a user indicating that the user should enter a code after an indication, said mitigation device comprising:
- a DTMF receiver for recognizing touch tone digits including a digit indicative of reset, and for producing a digit detect signal each time one of said touch tone digits is recognized as well as producing a code indicative of which of said touch tone digits is recognized;
- decoder means, receiving said indicative codes, for producing a plurality of outputs, one indicative of each said predetermined code which is received;
- code setting means, connected to at least a plurality of said outputs of said decoding means, and switchable to determine which of said outputs is a proper code to be recognized;
- counter means, connected to be advanced in count by said digit detect signal, for determining a cycle of operation indicative of how many digits have been detected by said DTMF receiver, and producing a plurality of count outputs indicative thereof;

a plurality of logic means, connected to one of said count outputs, and to outputs of said code setting means, each logic means for producing an active output when said code setting means produces an active output simultaneously with said counter means producing an active output on said one count output to which it is connected;

a plurality of latching means, each connected to an output of said logic means, for latching an indication that said logic means has produced an active output;

means for detecting when all of said latching means are active, and producing a code detect signal indicative thereof;

first timing means, responsive to said code detect signal, for producing a time period beginning at said code detect signal;

means for sending an off hook signal to the central office during said time period;

annunciating means for producing an annunciating tone at a user during said time period;

means for resetting both of said latching means and said timing means upon receiving said reset digit; and means for connecting said DTMF receiver and said sending means in parallel with a telephone line at all times after installation with the telephone line.

19. A system as in claim 18 further comprising first timing means, responsive to said code detect signal, for producing a time period beginning at said code detect signal;

means for sending an off hook signal to the central office during said time period; and annunciating means for producing an annunciating tone during said time period.

20. A system as in claim 19 wherein said logic means comprises a plurality of AND gates each having one input connected to an output of said counter means, and with its other input to an output of said code setting means.

21. A system as in claim 20 wherein said code setting means comprises a plurality of switches, each connected to a respective one of said outputs of said decoder means.

22. A system as in claim 21 wherein said detecting means comprises a multiple input AND gate.

23. A system as in claim 19 wherein one of the digits recognized by said DTMF receiver represents a reset digit, further comprising means for resetting both of said latching means and said timing means upon receiving said reset digit.

24. A system as in claim 18 further comprising an auxiliary latching means, responsive to a detection of an exclusion code, which is a code not normally dialed during touch tone calling operation, and which occurs at the same time as a predetermined cycle of said counter means, and wherein said detecting means is responsive to said auxiliary latching means, and produces said code detect signal only when said latching means and said auxiliary latching means are all simultaneously active.

25. A system as in claim 18 further comprising:

an auxiliary latching means, responsive to a detection of an exclusion code, which is a code not normally dialed during touch tone calling operation, and which occurs at the same time as a predetermined cycle of said counter means, and wherein said detecting means is responsive to said auxiliary latching means, and produces said code detect signal only when said latching means and said auxiliary latching means are all simultaneously active.

26. A system as in claim 25 wherein said exclusion code is a code from the group consisting of "#" and "*".

27. A telecommunications nuisance call mitigation device adapted for use with an answering machine of the type which plays a message to a caller indicating that the caller should enter a code, said mitigation device comprising:

means for recognizing a plurality of different touch-tone type characters;

code recognizing means for recognizing a predetermined sequence of predetermined ones of said touch tone characters, including one exclusion character which is not normally used during placing telephone calls, as a preset code;

timing means, responsive to said recognizing means, for beginning a predetermined time period after recognizing said code as coinciding with said preset code;

means, responsive to said timing means, for producing an off hook indication to a central office, during said predetermined time period, and for producing a signal indicative of a non-nuisance call during said time period; and means for connecting said recognizing means and said off hook indication producing means in parallel with a telephone line at all times after installation with the telephone line.

28. A telecommunications nuisance call mitigation device, comprising:

an answering machine configured to play a message to a caller indicating that the caller should enter a code;

means for recognizing whether a code entered after said message coincides with a preset code;

timing means, responsive to said recognizing means, for beginning a predetermined time period after recognizing said code as coinciding with said preset code;

means, responsive to said timing means, for producing an off hook indication to a central office, during said predetermined time period, and for producing a signal indicative of a non-nuisance call during said time period; and means for connecting said answering machine, said recognizing means and said off hook indication producing means in parallel with a telephone line at all times after installation with the telephone line.

29. A telecommunications nuisance call mitigation device adapted for use on a telephone line across two lines of which codes can be entered, and for use with an answering machine of the type which plays a message to a caller indicating that the caller should enter a code, said mitigation device comprising:

means, adapted to be continuously coupled in parallel across said two lines of said telephone line, for recognizing whether a code entered after said message is played coincides with a preset code;

timing means, responsive to said recognizing means, for beginning a predetermined time period after recognizing said code as coinciding with said preset code; and means, responsive to said timing means and adapted to be continously coupled in parallel across said two lines of said telephone line, for producing an off hook indication to said telephone line, during said predetermined time period, and for producing a signal indicative of a non-nuisance call during said time period.

* * * * *